United States Patent
Becker et al.

(10) Patent No.: US 6,682,334 B2
(45) Date of Patent: Jan. 27, 2004

(54) CLOSING UNIT FOR USE IN AN INJECTION MOLDING MACHINE FOR PROCESSING PLASTIC MATERIAL

(75) Inventors: Klaus Becker, Wetter (DE); Rüdiger Ostholt, Wetter (DE)

(73) Assignee: Mannesmann Plastics Machinery GmbH, München (DE)

(*) Notice: Subject to any disclaimer, the term of this patent is extended or adjusted under 35 U.S.C. 154(b) by 50 days.

(21) Appl. No.: 10/184,034

(22) Filed: Jun. 27, 2002

(65) Prior Publication Data

US 2003/0012846 A1 Jan. 16, 2003

Related U.S. Application Data

(63) Continuation of application No. PCT/DE00/04629, filed on Dec. 21, 2000.

(51) Int. Cl.[7] .............................................. B29C 45/64
(52) U.S. Cl. ..................... 425/214; 425/451.7; 425/592; 425/593
(58) Field of Search .............................. 425/214, 451.7, 425/592, 593

(56) References Cited

U.S. PATENT DOCUMENTS 4,797,086 A * 1/1989 Adachi ....................... 425/589
5,585,126 A * 12/1996 Heindl et al. ............... 425/593

FOREIGN PATENT DOCUMENTS

| DE | 195 24 314 C | 7/1996 |
|---|---|---|
| EP | 0 164 419 A | 12/1985 |
| EP | 0 245 517 B1 | 4/1991 |
| EP | 0 658 136 B1 | 2/1997 |
| GB | 1 184 909 A | 3/1970 |
| JP | 61 106221 A | 5/1986 |
| JP | 62 064520 A | 3/1987 |

* cited by examiner

Primary Examiner—James P. Mackey
(74) Attorney, Agent, or Firm—Henry M. Feiereisen

(57) ABSTRACT

A closing unit for an injection molding machine for processing plastic material includes a fixed mold mounting plate connected to a moveable mold mounting plate by means of a crank or toggle lever mechanism, which is operated by at least two motor-driven spindles arranged in series and having thread pitches in an opposite manner. One spindle is operatively connected to the fixed mounting plate, whereas the other spindle is connected to the crank or toggle lever mechanism. A sleeve-like force transmission element is arranged concentrically in relation to the spindles. Spindle nuts are respectively provided on opposite end faces of the force transmission element and interact with the power transmission element and the spindles.

19 Claims, 3 Drawing Sheets

CLOSING UNIT FOR USE IN AN INJECTION MOLDING MACHINE FOR PROCESSING PLASTIC MATERIAL

CROSS-REFERENCES TO RELATED APPLICATIONS

This application is a continuation of prior filed copending PCT International application no. PCT/DE00/04629, filed Dec. 21, 2000.

This application claims the priority of German Patent Application Serial No. 199 64 087.4, filed Dec. 27, 1999, pursuant to 35 U.S.C. 119(a)–(d), the subject matter of which is incorporated herein by reference.

BACKGROUND OF THE INVENTION

The present invention relates to a closing unit for an injection molding machine for processing plastic material.

Closing units for injection molding machines generally have a fixed mold mounting plate, a moveable mold mounting plate, and a linkage to connect the fixed plate with the moveable plate. European Pat. No. 0 658 136 B1 discloses an exemplary closing unit for molds of injection molding machines and describes the use of an electric motor which includes a hollow shaft. A threaded spindle is received within the hollow shaft for axial movement via a nut and secured to a toggle lever system or systems so as to be constraint against rotation. This conventional closing unit suffers shortcomings because it can be operated only in a single speed range, which, moreover, operates also at a fairly low level.

European Pat. No. 0 245 517 B1 discloses a closing unit for injection molding machines, including a single-piece spindle having two threaded portions with opposite thread pitch. The nuts corresponding with the threads move relative to one another whereby a threaded portion is disengageable by a clutch from executing a rotation movement. This spindle configuration is fairly bulky as the individual threaded portions must be spaced from one another at significant distance and the spindle drive must be mounted to the end of the spindle.

It would therefore be desirable and advantageous to provide an improved closing unit for an injection molding machine, to obviate prior art shortcomings and to enable high movement speeds and thus shorter cycles at minimum energy consumption while still being reliable in operation and simple in structure.

SUMMARY OF THE INVENTION

According to one aspect of the present invention, a closing unit for use with an injection molding unit for processing plastic material includes a fixed mold mounting plate, a moveable mold mounting plate, a linkage for connecting the moveable mounting plate to the fixed mounting plate, at least two spindles arranged in series and having thread pitches configured in opposite manner, one spindle operatively connected to the fixed mounting plate, and with the other spindle connected to the linkage; a drive mechanism intended for moving the moveable mounting plate relative to the fixed mounting plate and including a sleeve-like force transmission element, which is arranged in concentric surrounding relationship to the spindles and has opposite end faces, and an electric motor operatively connected to the force transmission element; and at least two spindle nuts, one spindle nut arranged at one of the end faces of the force transmission element and interacting with the force transmission element and one of the spindles, and the other spindle nut arranged at the other end face of the force transmission element and interacting with the force transmission element and the other one of the spindles.

The present invention resolves prior art problems by providing two spindles with opposite pitch so that a rotation of the force transmission element translates in a speed that is twice as fast compared to conventional systems for closing and opening the moveable mold mounting plate.

The electric motor may be a hollow shaft motor. Suitably, the hollow shaft motor operates the force transmission element and is moveable in axial direction while constrained against rotation by an anti-rotation device. The anti-rotation device is realized by form elements, which may, for example, embrace as sleeves rods or bars of the injection molding machine, or have positively engaging members in the form of tongue and groove to provide a conjointly moving torque support.

According to another feature of the present invention, the drive of the sleeve-like force transmission element may include a stationary electric motor which has driving elements, such as gears or belts, to positively connect to the force transmission element to thereby allow an unhindered movement of the entire drive in an axial direction. In the case of a belt drive, this can be realized, e.g., by configuring the force transmission element as double sleeve in the form of an inner sleeve and an outer sleeve which are interconnected by a spline profile so that the inner sleeve can move in an axial direction, as the outer sleeve rotates while being fixed in place.

The spindles may have any desired pitch. Currently preferred, however, is the provision of an identical pitch of both spindles.

According to another feature of the present invention, there may be provided an end plate, which is connected to the fixed mounting plate, and a slip-controlled brake, which is disposed between the end plate and the one spindle for allowing rotation of the one spindle in radial direction. This spindle can hereby be operated by a further electric motor. In this way, random speeds are possible and generated clamping forces can be modified as desired, while still avoiding an inadvertent return movement of the spindle nuts relative to the spindles.

The motor-driven mechanism according to the invention is applicable for two-platen machines as well as for three-platen machines.

According to another feature of the present invention, there may be provided a protective cover, e.g. a bellows, for enveloping the spindles.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
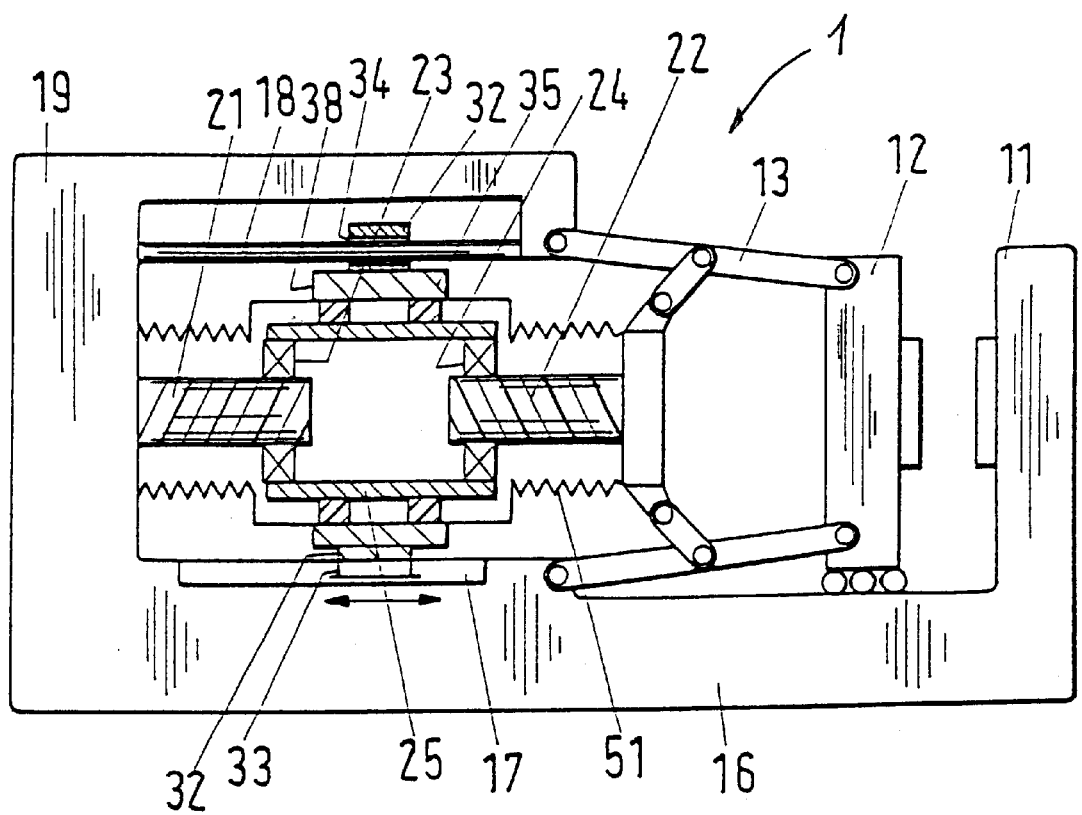
FIG. 1 is a partly sectional side view of a first embodiment of a closing unit according to the present invention, showing the arrangement of a toggle lever mechanism operated by a hollow shaft motor.

Throughout all the Figures, same or corresponding elements are generally indicated by same reference numerals.

Turning now to the drawing, and in particular to FIG. 1, there is shown a partly sectional side view of a first embodiment of a closing unit according to the present invention, generally designated by reference numeral 1 and including a fixed mold mounting plate 11 and a moveable mold mounting plate 12 which is operated by a linkage in the form of toggle lever mechanism 13 in axial direction relative to the fixed mounting plate 11. The fixed mounting plate 11 is connected via a machine bed 16 with an end plate 19. Mounted to the end plate 19 is a spindle 21, which is in threaded engagement with a spindle nut 23. A sleeve-like force transmission element 25 connects the spindle nut 23 with a spindle nut 24, which is in threaded engagement with a spindle 22 operatively connected to the toggle lever mechanism 13.

The spindle nuts 23, 24 are respectively secured on opposite end faces of the force transmission element 25 which is driven by an electric motor configured as a hollow shaft motor 35. The hollow shaft motor 35 has a motor casing 38 for attachment of upper and lower form elements 32 which provide a torque support for the electric motor. The upper form element 32, as viewed in FIG. 1, includes an eyelet 34 for passage of a rod 18 whereas an end face of the lower form element 32 supports a key 33 for engagement in a groove 17 in the machine bed 16.

A bellows 51 envelopes the spindles 21, 22 and the sleeve-like force transmission element 25 to form a protective cover, and is secured on opposite sides to the end plate 19 and the toggle lever mechanism 13, respectively.

At operation, the hollow shaft motor 35 moves the force transmission element 25 in axial direction, as indicated by the double arrow, for moving the mounting plate 12 relative to the fixed mold mounting plate 11. Hereby, the hollow shaft motor 35 moves conjointly in axial direction, as the spindles 21, 22 are displaced toward or away from one another via the toggle lever mechanism 13 to operate the mobile mounting plate 12. Thus, the toggle lever mechanism 13 is driven by the axially moving hollow shaft motor 35, whereby the spindles 21, 22 move simultaneously in opposite directions. A rotation of the hollow shaft motor 35 is prevented by the guidance of the upper form element 32 along the rod 16 and engagement of key 33 of the lower form element 32 in the groove 17.

Figure 2:
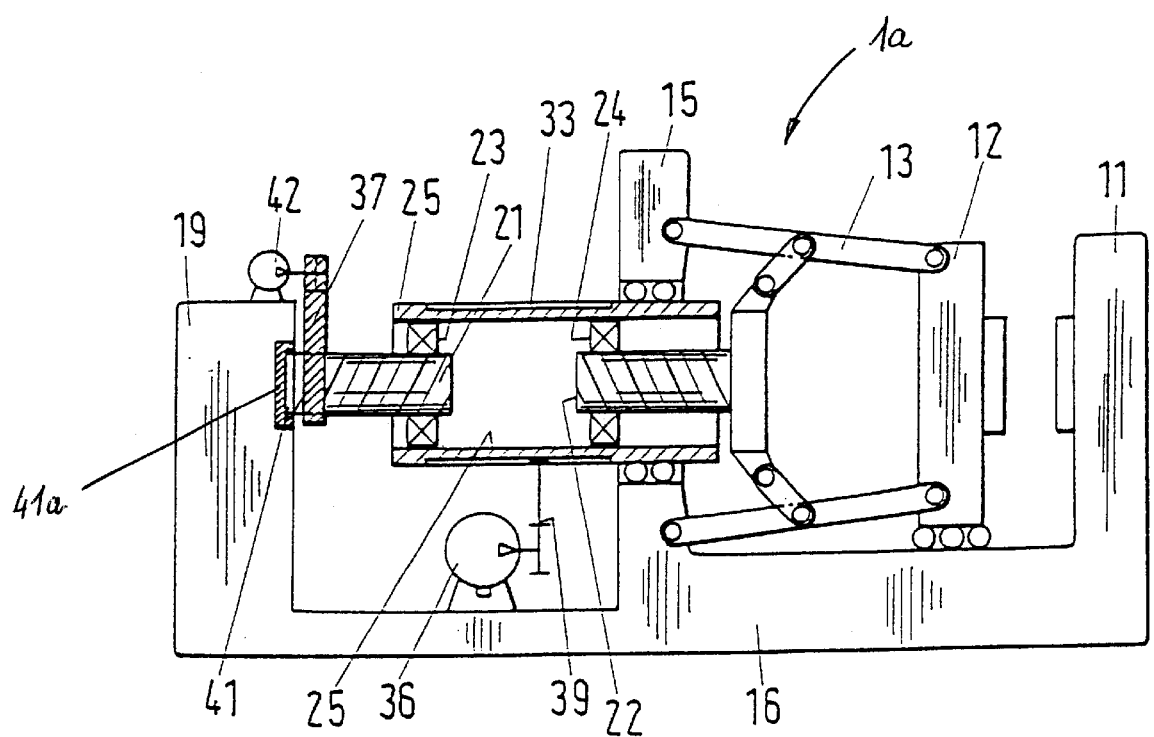
FIG. 2 is a partly sectional side view of a second embodiment of a closing unit according to the present invention, showing the arrangement of a toggle lever mechanism operated by a stationary motor.

FIG. 2 is a partly sectional side view of a second embodiment of a closing unit according to the present invention, generally designated by reference numeral 1a. Parts corresponding with those in FIG. 1 are denoted by identical reference numerals and not explained again. In this embodiment, provision is made for a stationary electric motor 36, instead of a mobile hollow shaft motor, for operating the sleeve-like force transmission element 25. The closing unit 1a includes an intermediate plate 15 for rotatable support and axial guidance of the force transmission element 25. The electric motor 36 has a driving gear 39, which is in driving relationship with and received in form-fitting manner in a slot 33 of the force transmission element 25. Mounted to the end plate adjacent end face of the spindle 21 is a slip-controlled brake 41 having a brake portion 41a which is received in the end plate 19. The spindle 21 is operated by a second electric motor 42 which is in driving relationship with the spindle 21 via a belt 37. Of course, the use of belt 37 as force transfer is shown by way of example only, and other types of force transfer means that are at the disposal of the skilled artisan may be applicable as well. The arrangement of the added electric motor 42 allows random speeds and generated clamping forces can be modified as desired, while still avoiding an inadvertent return movement of the spindle nuts 23, 24 relative to the spindles 21, 22.

At operation, the stationary motor 36 moves via the driving gear 39 the force transmission element 25 in axial direction to thereby shift the spindles 21, 22 toward or away from one another to operate the mobile mounting plate 12 via the toggle lever mechanism 13 relative to the fixed mounting plate 11.

Figure 3:
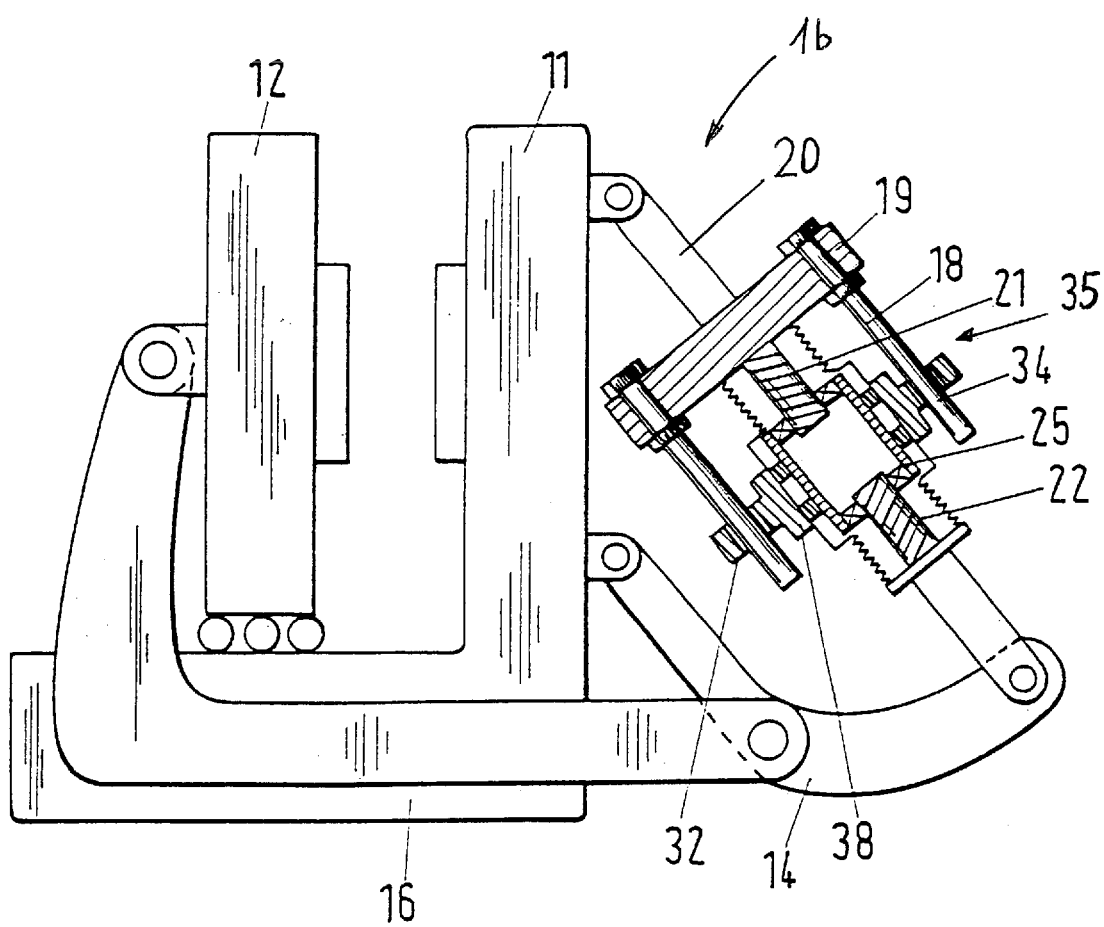
FIG. 3 is a partly sectional side view of a third embodiment of a closing unit according to the present invention, showing the arrangement of a crank mechanism for a two-platen machine.

FIG. 3 is a partly sectional side view of a third embodiment of a closing unit according to the present invention, generally designated by reference numeral 1b, for use with a two-platen machine including the fixed mold mounting plate 11 and the moveable mold mounting plate 12. Parts corresponding with those in FIG. 1 are denoted by identical reference numerals and not explained again. In this embodiment, provision is made for a linkage in the form of a crank mechanism 14, instead of a toggle lever mechanism, for translating the operation of an electric motor 35 into a displacement of the mobile mold mounting plate 12. Hereby the crank mechanism 14 is secured for angular movement via the electric motor 35 to the fixed mounting plate 12. The electric motor 35 is implemented in the form of a hollow shaft motor whose motor casing 38 has at least two form elements 32 with eyelets 34. Extending through the eyelets 34 are bars 18 which are secured on one end face to end plate 19. Spindle 21 is mounted to one side of the end plate 19, whereas the fixed mounting plate 11 is connected to the other side of the end plate 19 via a link 20. Operation of the spindles 21, 22 is realized in a same manner as described in conjunction with the closing unit 1 of FIG. 1.

While the invention has been illustrated and described as embodied in a closing unit for use in an injection molding machine for processing plastic material, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A closing unit for use with an injection molding unit for processing plastic material, comprising:
   a fixed mold mounting plate;
   a moveable mold mounting plate;
   a linkage for connecting the moveable mounting plate to the fixed mounting plate;
   at least two spindles arranged in series and having thread pitches configured in opposite manner, one spindle operatively connected to the fixed mounting plate, and with the other spindle connected to the linkage;
   a drive mechanism for moving the moveable mounting plate relative to the fixed mounting plate, said drive mechanism including a sleeve-like force transmission element, which is arranged in concentric surrounding relationship to the spindles and has opposite end faces, and a first electric motor, which is operatively connected to the force transmission element; and at least two spindle nuts, one spindle nut arranged at one of the end faces of the force transmission element and interacting with the force transmission element and one of the spindles, and the other spindle nut arranged at the other end face of the force transmission element and interacting with the force transmission element and the other one of the spindles.

2. The closing unit of claim 1, wherein the first electric motor is a hollow shaft motor.

3. The closing unit of claim 2 wherein the hollow shaft motor is arranged in surrounding relationship to the force transmission element.

4. The closing unit of claim 2, wherein the hollow shaft motor is moveable in an axial direction conjointly with an axial displacement of the force transmission element in order to move the spindles in axial direction.

5. The closing unit of claim 1, wherein the linkage is a toggle lever mechanism.

6. The closing unit of claim 1, wherein the linkage is a crank mechanism.

7. The closing unit of claim 2, wherein the hollow shaft motor has a motor housing and is connected to the force transmission element for conjoint movement, and further comprising at least one form element attached to and supporting the motor housing to constrain the motor housing against rotation.

8. The closing unit of claim 7 wherein the form element includes a first member selected from the group consisting of groove and key and represents part of an anti-rotation device which further includes a second member selected from the group consisting of groove and key, for interaction with the first member.

9. The closing unit of claim 7, and further comprising at least one rod or bar in parallel relationship to the spindles, wherein the form element includes an eyelet which embraces the rod or bar, without impairing an axial movement of the hollow shaft motor.

10. The closing unit of claim 1, wherein the electric motor is stationary and has a driving element positively connected with the force transmission element to allow an unhindered movement of the force transmission element in an axial direction.

11. The closing unit of claim 10, wherein the driving element includes a belt for connecting the first electric motor and the force transmission element.

12. The closing unit of claim 10, wherein the driving element includes a gear for connecting the first electric motor and the force transmission element.

13. The closing unit of claim 1, wherein the spindles have identical pitch.

14. The closing unit of claim 1, and further comprising an end plate connected to the fixed mounting plate, and a slip-controlled brake disposed between the end plate and the one spindle for allowing rotation of the one spindle in radial direction.

15. The closing unit of claim 13, wherein the drive mechanism includes a second electric motor for driving the one spindle.

16. The closing unit of claim 15, wherein the first electric motor is connectable via a belt to the force transmission element and/or the second electric motor is connectable via a belt to the one spindle.

17. The closing unit of claim 1, and further comprising a protective cover for enveloping the spindles.

18. The closing unit of claim 17, wherein the protective cover is a bellows.

19. The closing unit of claim 1, wherein the force transmission element is constructed as a double sleeve including an inner sleeve and an outer sleeve which are interconnected by a spline profile so that the inner sleeve is axially moveable, as the outer sleeve rotates while being fixed in place.

* * * * *